United States Patent
Akamatsu et al.

(10) Patent No.: US 10,866,587 B2
(45) Date of Patent: Dec. 15, 2020

(54) SYSTEM, METHOD, AND COMPUTER PROGRAM FOR MOBILE BODY MANAGEMENT

(71) Applicant: Nidec-Shimpo Corporation, Nagaokakyo (JP)

(72) Inventors: Masahiro Akamatsu, Nagaokakyo (JP); Syunta Sato, Nagaokakyo (JP)

(73) Assignee: NIDEC SHIMPO CORPORATION, Kyoto (JP)

( * ) Notice: Subject to any disclaimer, the term of this patent is extended or adjusted under 35 U.S.C. 154(b) by 137 days.

(21) Appl. No.: 16/095,000

(22) PCT Filed: Apr. 26, 2017

(86) PCT No.: PCT/JP2017/016460
§ 371 (c)(1),
(2) Date: Oct. 19, 2018

(87) PCT Pub. No.: WO2017/188292
PCT Pub. Date: Nov. 2, 2017

(65) Prior Publication Data
US 2019/0155275 A1    May 23, 2019

Related U.S. Application Data

(60) Provisional application No. 62/328,177, filed on Apr. 27, 2016.

(51) Int. Cl.
*G05D 1/00*    (2006.01)
*G05D 1/02*    (2020.01)

(52) U.S. Cl.
CPC ......... *G05D 1/0022* (2013.01); *G05D 1/0044* (2013.01); *G05D 1/02* (2013.01);
(Continued)

(58) Field of Classification Search
CPC ...... G05D 1/0044; G05D 1/02; G05D 1/0214; G05D 1/0274; G05D 1/0276
(Continued)

(56) References Cited

U.S. PATENT DOCUMENTS

| 6,092,010 A | 7/2000 | Alofs et al. |
| 2006/0010844 A1 | 1/2006 | Angott |

(Continued)

FOREIGN PATENT DOCUMENTS

| JP | 11-143534 A | 5/1999 |
| JP | 11-154013 A | 6/1999 |

(Continued)

OTHER PUBLICATIONS

Official Communication issued in International Patent Application No. PCT/JP2017/016460, dated Aug. 8, 2017.

*Primary Examiner* — Albert K Wong
(74) *Attorney, Agent, or Firm* — Keating & Bennett

(57) ABSTRACT

There is provided a management system for vehicles which can make it easier to introduce changes in the traveling path on the field. A management system 1 manages travel of a vehicle by using a travel management apparatus. The vehicle includes a plurality of driving wheels to be driven by a plurality of motors, a drive unit to rotate the driving wheels, a first communication circuit which receives data representing a traveling path from the travel management apparatus, and a control circuit which causes the vehicle to travel along the traveling path. The travel management apparatus includes: an image displaying device; an input device; an image processing circuit which generates, when the input device accepts from a user a designation of a plurality of locations on the image displaying device, an image containing a plurality of marker objects indicating the plurality of locations; a signal processing circuit which converts a set of coordinates of each marker object on the image into a set of (Continued)

coordinates in a space to be traveled by the vehicle, and sets a line segment or a curve on the image displaying device that interconnects the plurality of marker objects as the traveling path in the space; and a second communication circuit which transmits data representing each set of coordinates in the space and the traveling path to the vehicle.

21 Claims, 15 Drawing Sheets

(52) U.S. Cl.
CPC ........... *G05D 1/024* (2013.01); *G05D 1/0214* (2013.01); *G05D 1/0223* (2013.01); *G05D 1/0246* (2013.01); *G05D 1/0274* (2013.01); *G05D 1/0276* (2013.01)

(58) Field of Classification Search
USPC .............................................................. 701/2
See application file for complete search history.

(56) References Cited

U.S. PATENT DOCUMENTS

| | | |
|---|---|---|
| 2007/0156321 A1 | 7/2007 | Schad |
| 2011/0054689 A1 | 3/2011 | Nielsen et al. |
| 2015/0286218 A1* | 10/2015 | Shani ................... G05D 1/0246 701/2 |
| 2015/0346718 A1* | 12/2015 | Stenneth ............ G06Q 30/0611 701/2 |
| 2016/0033963 A1 | 2/2016 | Noh |
| 2016/0147233 A1* | 5/2016 | Whinnery ........... G06F 3/04886 701/2 |

FOREIGN PATENT DOCUMENTS

| | | |
|---|---|---|
| JP | 2002-085305 A | 3/2002 |
| JP | 2002-244731 A | 8/2002 |
| JP | 2007-226322 A | 9/2007 |
| JP | 2010-198064 A | 9/2010 |
| JP | 2012-089078 A | 5/2012 |
| KR | 10-2014-0046318 A | 4/2014 |
| WO | 2008/035433 A1 | 3/2008 |

\* cited by examiner

FIG.2
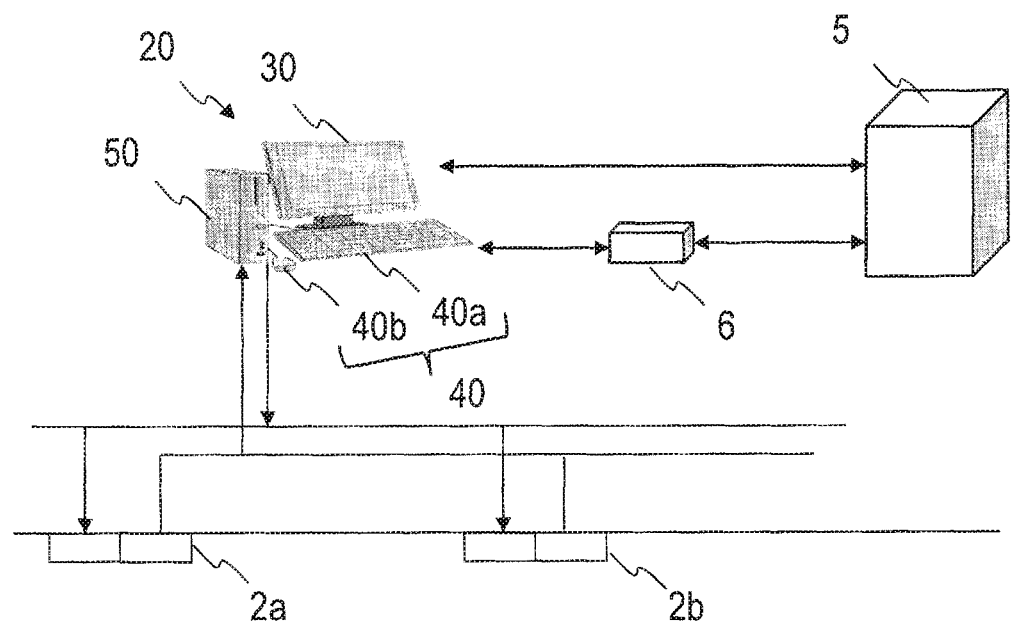
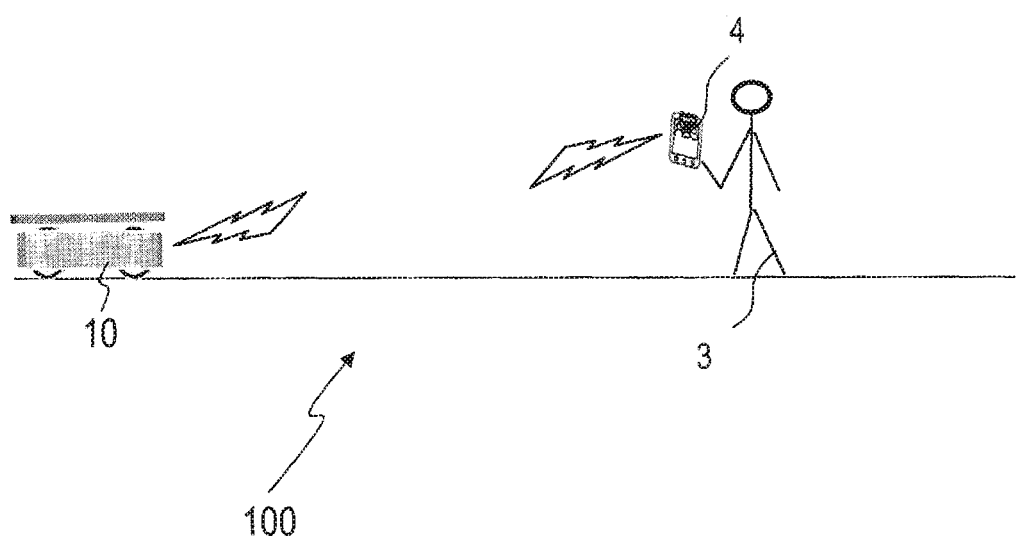

FIG.8

ERROR HISTORY

S-CART: ☐ S-CART1, ☐ S-CART2  [SELECT] [CLEAR] [UPDATE]   [DELETE] [CLOSE]

| S-CART | TIME/DATE | PLACE | | | | HISTORY | |
|---|---|---|---|---|---|---|---|
| S-CART1 | 2016/01/28 16:54 | 01 101 | X: 00000 | Y: 00000 | $\theta$ : 00000 | E0 | POWER VOLTAGE ABNORMAL |
| S-CART1 | 2016/01/28 16:55 | 01 101 | X: 00000 | Y: 00000 | $\theta$ : 00000 | E1 | DRIVER ABNORMAL |

FIG.9

ROUTE HISTORY

S-CART: ☐ S-CART1, ☐ S-CART2  [SELECT] [CLEAR] [UPDATE]   [DELETE] [CLOSE]

| S-CART | TIME/DATE | | HISTORY |
|---|---|---|---|
| S-CART1 | 2016/01/28 16:54 | 01 101 | M001 |
| S-CART1 | 2016/01/28 16:55 | 01 101 | M002 |

FIG.12

| No. | ATTRI-BUTE | LOCA-TION X | LOCA-TION Y | ANGLE θ | CAR ORIENTATION | CONNEC-TED | TARGET | CONDIT-ION | VELOCI-TY |
|---|---|---|---|---|---|---|---|---|---|
| 1 | M000 | 0 | 0 | 0 | FORE | M001 | AGVT1 | 1 | 30 |

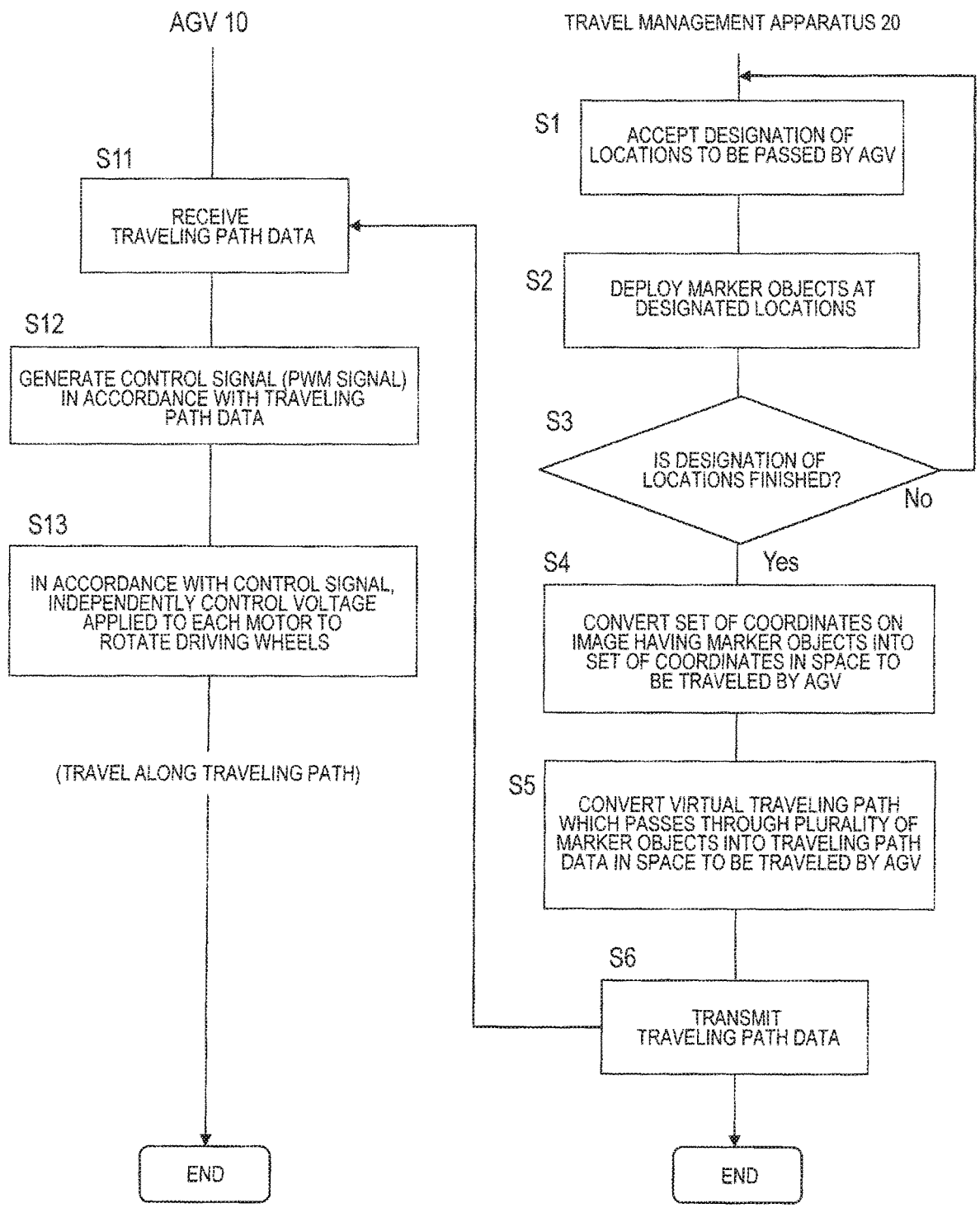

SYSTEM, METHOD, AND COMPUTER PROGRAM FOR MOBILE BODY MANAGEMENT

TECHNICAL FIELD

The present disclosure relates to a management system, method, and computer program for managing travel of vehicles.

BACKGROUND ART

Automated guided vehicles and systems for controlling movement of automated guided vehicles are under development. Automated guided vehicles may also be called "AGVs".

Patent Document 1 discloses a vehicle which has a tag communication section. A plurality of IC tags having respective pieces of location information are distributed over an area for travel. As a vehicle travels, the tag communication section performs wireless communications with the IC tags to read location information of the IC tags. Through this, the vehicle acquires information of its current location, thereby being able to perform automated travel.

Patent Document 2 discloses a system which causes an AGV to move to a designated location. An AGV reads location markers representing locations, and in moving to a designated location, if its location is deviated, makes a correction by using its own navigation system.

Patent Document 3 discloses a technique in which, prior to laying address marks on a course in which an AGV is to travel, the locations of the address marks are determined through simulations.

CITATION LIST

Patent Literature

[Patent Document 1] International Publication No. 2008/035433
[Patent Document 2] Japanese Laid-Open Patent Publication No. 11-154013
[Patent Document 3] Japanese Laid-Open Patent Publication No. 11-143534

SUMMARY OF INVENTION

Technical Problem

The techniques according to Patent Documents 1 to 3 above are each directed to a technique where IC tags or location markers that are needed for location detection are deployed in advance over an area for travel of an AGV, and a path for the AGV to take is previously determined. Once the AGV is put in operation, if a need to change the locations of IC tags or location markers arises on the field, tremendous amounts of work may be required to make the change.

In a non-limiting and illustrative embodiment of the present application, there is provided a management system for AGVs which makes it easier to introduce changes in the traveling path on the field.

Solution to Problem

In an illustrative embodiment, a management system according to the present disclosure is a management system comprising at least one vehicle and a travel management apparatus, the management system managing travel of the vehicle by using the travel management apparatus, wherein, the vehicle includes: a plurality of motors; a plurality of driving wheels respectively coupled to the plurality of motors; a drive unit which independently controls a voltage to be applied to each motor in accordance with a control signal, to rotate each of the plurality of driving wheels; a first communication circuit which communicates with the travel management apparatus to receive data representing a traveling path; and a control circuit which generates the control signal for causing the vehicle to travel along the traveling path, and the travel management apparatus includes: an image displaying device; an input device which accepts a manipulation by a user; an image processing circuit which generates an image to be displayed on the image displaying device, the image processing circuit generating, when the input device accepts from the user a designation of a plurality of locations on the image displaying device, an image containing a plurality of marker objects indicating the plurality of locations; a signal processing circuit which converts a set of coordinates of each marker object on the image into a corresponding set of coordinates in a space to be traveled by the vehicle, and sets a line segment or a curve on the image displaying device that interconnects the plurality of marker objects as the traveling path in the space; and a second communication circuit which transmits data representing each set of coordinates in the space and the traveling path to the vehicle.

In an illustrative embodiment, another management system according to the present disclosure is a management system comprising a plurality of vehicles and a managing computer, the management system managing travel of each vehicle by using the managing computer, wherein, the vehicle travels with a plurality of driving wheels, and is capable of communicating with the managing computer; the managing computer is capable of generating a traveling path for the vehicle from a plurality of marker deployed on a map image; and, when the traveling path passes through a second marker next to a first marker among the plurality of markers, the first marker comprises, as attribute information, information of a coordinate position of the first marker and information specifying the second marker to be passed next.

Advantageous Effects of Invention

With a management system according to one implementation of the present invention, when a user designates a plurality of locations via an input device of a travel management apparatus, an image processing circuit of the travel management apparatus generates an image containing a plurality of marker objects indicating the plurality of locations. The marker objects correspond to locations to be passed by a vehicle. A signal processing circuit of the travel management apparatus converts a set of coordinates of each marker object on the image into a set of coordinates in a space to be traveled by the vehicle, and sets a line segment(s) or a curve(s) on the image displaying device that interconnects the plurality of marker objects as a traveling path for the vehicle in the space. The vehicle receives the traveling path data having been set, and moves along the traveling path. By using locations of the marker objects displayed on the image displaying device as locations to be passed by the vehicle, the user is able to recognize a line segment(s) or a curve(s) interconnecting the locations to be passed as a virtual traveling path for the vehicle. This eliminates the need to deploy IC tags or the like, these having location information stored therein, over an area for travel of the vehicle. Moreover, since the traveling path can be changed by changing the locations of the marker objects on the image, it is easy to change the traveling path for the vehicle.

BRIEF DESCRIPTION OF DRAWINGS

FIG. 2 is a diagram showing an example where a user 3 uses a tablet computer 4 to run an AGV 10.

FIG. 8 is a diagram showing an exemplary image 70 to be displayed on the monitor 30 after a button object 63a (FIG. 7) is selected.

FIG. 9 is a diagram showing an exemplary image 80 to be displayed on the monitor 30 after a button object 63b (FIG. 7) is selected.

FIG. 12 is a diagram showing an exemplary first image 120 to be displayed on the monitor 30 after a button object 63d (FIG. 7) is selected.

FIG. 15 is a flowchart showing processing by the travel management apparatus 20 and the respective procedures of processes of the AGV 10 as it travels based on results of the processing.

DESCRIPTION OF EMBODIMENTS

Hereinafter, with reference to the attached drawings, an exemplary management system according to the present disclosure, including a vehicle(s) and a travel management apparatus, will be described. In the present specification, automated guided vehicles will be illustrated as exemplary vehicles. An automated guided vehicle, also called AGVs, will be denoted as "AGVs" in the present specification.

Figure 1:
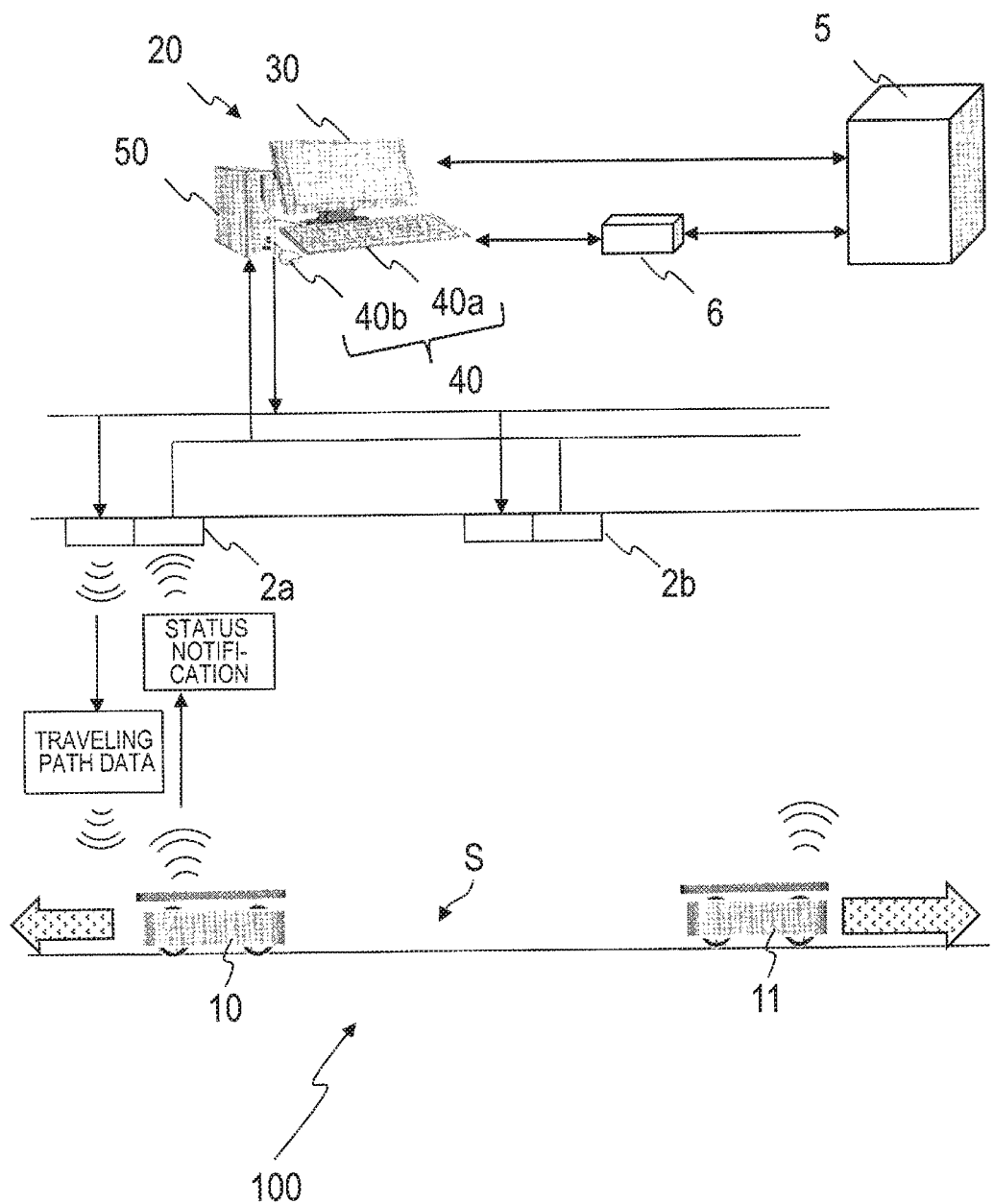
FIG. 1 is a diagram showing in outline a management system 100 according to the present disclosure, which manages travel of respective AGVs.

FIG. 1 a diagram showing in outline a management system 100 according to the present disclosure, which manages travel of respective AGVs. In the illustrated example, AGVs 10 and 11 retain map data, and travel while recognizing the locations at which they are currently traveling. The AGVs 10 and 11 each receives data of a traveling path that is transmitted from the travel management apparatus 20, and travels within a space S in accordance with the traveling path data. Each of the AGVs 10 and 11 drives its internal motors so as to travel along its traveling path, and moves by rotating the wheels (driving wheels) which are coupled to the respective motors. The traveling path data is wirelessly sent from the travel management apparatus 20 to the AGVs 10 and 11. The communication between the AGV 10 and the travel management apparatus 20 and the communication between the AGV 11 and the travel management apparatus 20 are performed by way of wireless access points 2a, 2b, etc., that are provided near the ceiling of a factory. Communications may comply with the Wi-Fi (registered trademark) standards, for example. The number of wireless access points may be arbitrary.

Although FIG. 1 illustrates two AGVs 10 and 11, the number of AGV(s) may be one, three, four, or five or more. The travel management apparatus 20 generates traveling path data for each AGV, and transmits it to the AGV.

The AGVs to be managed by the travel management apparatus 20 are AGVs that have been registered to the travel management apparatus 20 by the user, for example. As used herein, to "be managed" may encompass not only management of the aforementioned traveling paths, but also management of the operations of the respective AGVs, management of traveling states and stopped states and the like, management of an error history, and management of a traveling path history.

The following description will illustrate the AGV as an example. The following description similarly applies to the AGV 11 and any other AGV not shown.

In outline, the operation of the management system 100 is as follows. The management system 100 includes at least one AGV 10 and the travel management apparatus 20, and utilizes the travel management apparatus 20 to manage travel of the AGV 10.

The travel management apparatus 20 includes a monitor 30 as an image displaying device, a keyboard 40a and a mouse 40b as input devices with which to accept user manipulations, and a PC 50. The keyboard 40a and/or the mouse 40b are devices which will accept the user's designation of a plurality of locations on the monitor 30. In the present specification, the keyboard 40a and mouse 40b will be collectively referred to as the "input device 40". As will be described later, the PC 50 includes a CPU (Central Processing Unit) as a signal processing circuit, an image processing circuit which generates an image to be displayed on the monitor 30, and a communication circuit. In general terms, the monitor 30, the keyboard 40a and mouse 40b, and the PC 50 would be collectively referred to as a "PC" or a "computer". The travel management apparatus 20 shown in FIG. 1 may also be referred to as a "managing PC" or a "managing computer". The managing PC may be a laptop-type PC.

On the monitor 30, a planar map image of the space S as acquired through a data terminal not shown may be displayed. The user is able to designate locations on the planar map image of the space S, as locations via which the AGV 10 will travel.

The image processing circuit generates an image which contains a plurality of marker objects representing a plurality of locations. An image of a marker object may be for example. Specific examples thereof will be described later. Images of marker objects may be displayed in an additive manner onto the image on the monitor 30 every time a location is designated, or alternatively, after a plurality of locations have been designated, they may be displayed on the monitor 30 all at the same time when the user has made a manipulation indicating completion of designation. In the present specification, to deploy images of marker objects over a planar map image may be expressed as "to deploy markers". Moreover, attribute information (described later) of a marker object may be referred to as "attribute information of a marker".

A CPU 21 converts a set of coordinates of each marker object on the image into a set of coordinates within the space S to be traveled by the AGV 10. In doing so, the CPU converts a line segment(s) or a curve(s) on the monitor 30 that interconnects the plurality of marker objects into a path within the space S, and sets it as a traveling path for the AGV 10. The communication circuit transmits data representing the traveling path to the AGV 10.

The AGV 10 includes a communication circuit, and receives data representing the traveling path communicated from the travel management apparatus 20. Furthermore, the AGV 10 includes a plurality of motors, a plurality of driving wheels that are respectively coupled to the plurality of motors, a drive unit for the respective motors, and a control circuit. As the control circuit generates a control signal, e.g. a PWM signal, for causing the AGV 10 to travel along the traveling path, the drive unit independently controls the voltage to be applied to each motor in accordance with the PWM signal. As a result, each motor rotates so that the AGV 10 moves along the traveling path as received from the travel management apparatus 20.

Note that the travel management apparatus 20 may be connected in a manner which enables communication with an external system 5. The travel management apparatus 20 is able to perform serial communications with the external system 5 in a manner compliant with the Ethernet (registered trademark) standards. Alternatively, the travel management apparatus 20 may communicate with the external system 5 via a PLC communication terminal 6. In this case, serial communications may be performed in a manner compliant with Ethernet (registered trademark) standards between the travel management apparatus 20 and the PLC communication terminal 6, while serial communications utilizing a power line may be performed between the PLC communication terminal 6 and the external system 5.

FIG. 1 illustrates an example where the travel management apparatus 20 manages travel of the AGV 10 by transmitting a traveling path to the AGV 10. However, the user may directly manipulate the AGV 10 by using a communication terminal, e.g., a tablet computer. FIG. 2 shows an example where a user 3 uses a tablet computer 4 to run the AGV 10. Note that the tablet computer 4 and the AGV 10 may be connected e.g. in a one-on-one relationship to perform communications in a manner compliant with the Bluetooth (registered trademark) standards, or perform communications in a manner compliant with the Wi-Fi (registered trademark) standards via the wireless access points 2a, 2b, etc.

When directly manipulating the AGV 10 by using the tablet computer 4, the AGV 10 will travel in accordance with manipulations by the user 3, even if traveling path data has been received from the travel management apparatus 20. When connection with the tablet computer 4 is cut, the AGV 10 is able to travel in accordance with the traveling path data received from the travel management apparatus 20.

Next, with reference to FIG. 3 to FIG. 6, the construction of the AGV 10 and the travel management apparatus 20 will be described.

Figure 3:
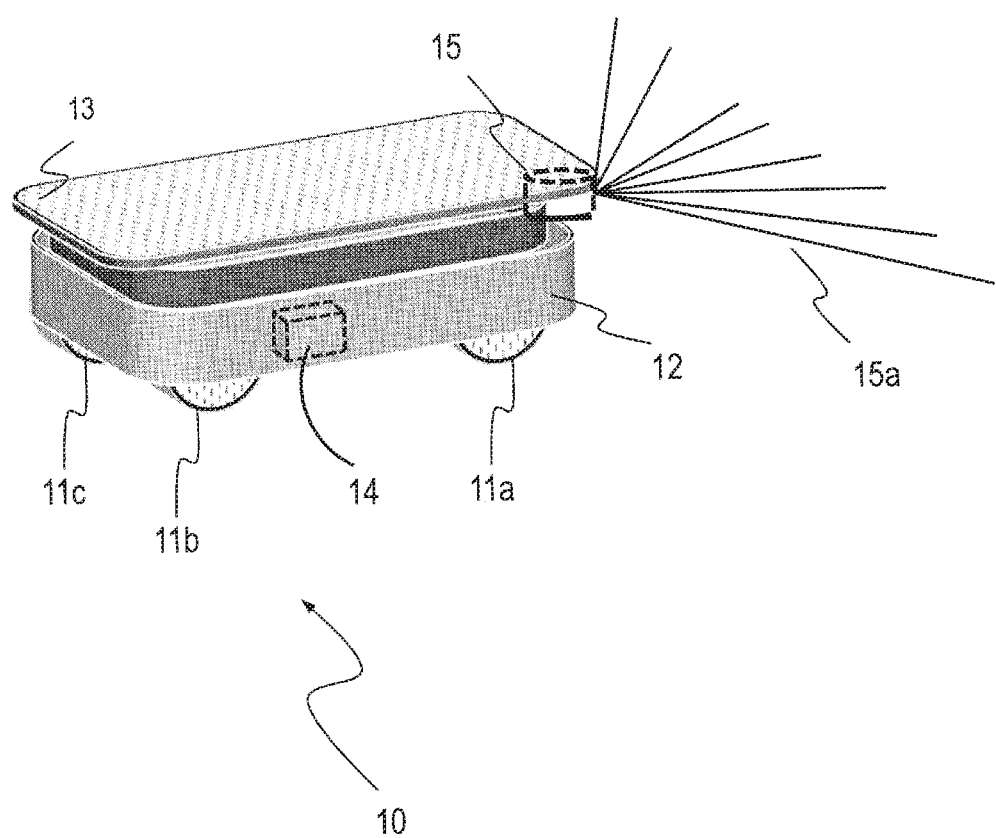
FIG. 3 is an outer view of an exemplary AGV 10 according to the present embodiment.

FIG. 3 is an outer view of an exemplary AGV 10 according to the present embodiment. The AGV 10 includes four wheels 11a through 11d, a frame 12, a carriage table 13, a travel control unit 14, and a laser range finder 15. Although the AGV 10 also includes a plurality of motors, they are not shown in FIG. 3. Although FIG. 3 illustrates a front wheel 11a, a rear wheel 11b, and a rear wheel 11c, a front wheel 11d is obscured because it is behind the frame 12.

The travel control unit 14 is a device to control operation of the AGV 10, and mainly includes an integrated circuit including a microcontroller (described later), electronic components, and a substrate on which these are mounted. The travel control unit 14 performs data exchanges with the travel management apparatus 20 as described above, as well as preprocessing computations.

The laser range finder 15 is an optical instrument which irradiates a target object with e.g. infrared laser light 15a, and detects reflected light of the laser light 15a to measure a distance to the target object. In the present embodiment, for example, the laser range finder 15 of the AGV emits pulsed laser light 15a in a space ranging 135 degrees to the right and the left (for a total of 270 degrees) of the front of the AGV 10, while altering its direction by every 0.25 degrees, and detects reflected light of the respective laser light 15a. This provides data of distance to the point of reflection in directions determined by a total of 1080 steps of angle in every 0.25 degrees.

From the location and attitude of the AGV 10, and scanning results by the laser range finder 15, deployment of the objects around the AGV is ascertained. Generally speaking, the location and attitude of a vehicle is referred to as a pose. The location and attitude of a vehicle in a two-dimensional plane is expressed by a position coordinates (x, y) in an XY orthogonal coordinate system and an angle θ with respect to the X axis. The location and attitude, i.e., pose (x, y, θ), of the AGV 10 may hereinafter be simply referred to as its "location".

Note that the location of a point of reflection as viewed from the location at which the laser light 15a is emitted may be expressed by using polar coordinates that are defined in terms of angle and distance. In the present embodiment, the laser range finder 15 outputs sensor data that is expressed in polar coordinates. However, the laser range finder 15 may convert a location that is expressed in polar coordinates into orthogonal coordinates for output.

The structure and operation principles of a laser range finder are known, and any more detailed description thereof will be omitted in the present specification. Examples of objects that are detectable by the laser range finder 15 include humans, luggage, shelves, and walls.

The laser range finder 15 is an example of an external sensor that senses a surrounding space to acquire sensor data. Other examples of such external sensors may be image sensors and ultrasonic sensors.

The travel control unit 14 compares the result of measurement by the laser range finder 15 against the map data that is retained in itself, thereby being able to estimate its own current location. The map data may be acquired by the AGV 10 itself, by using an SLAM (Simultaneous Localization and Mapping) technique.

Figure 4:
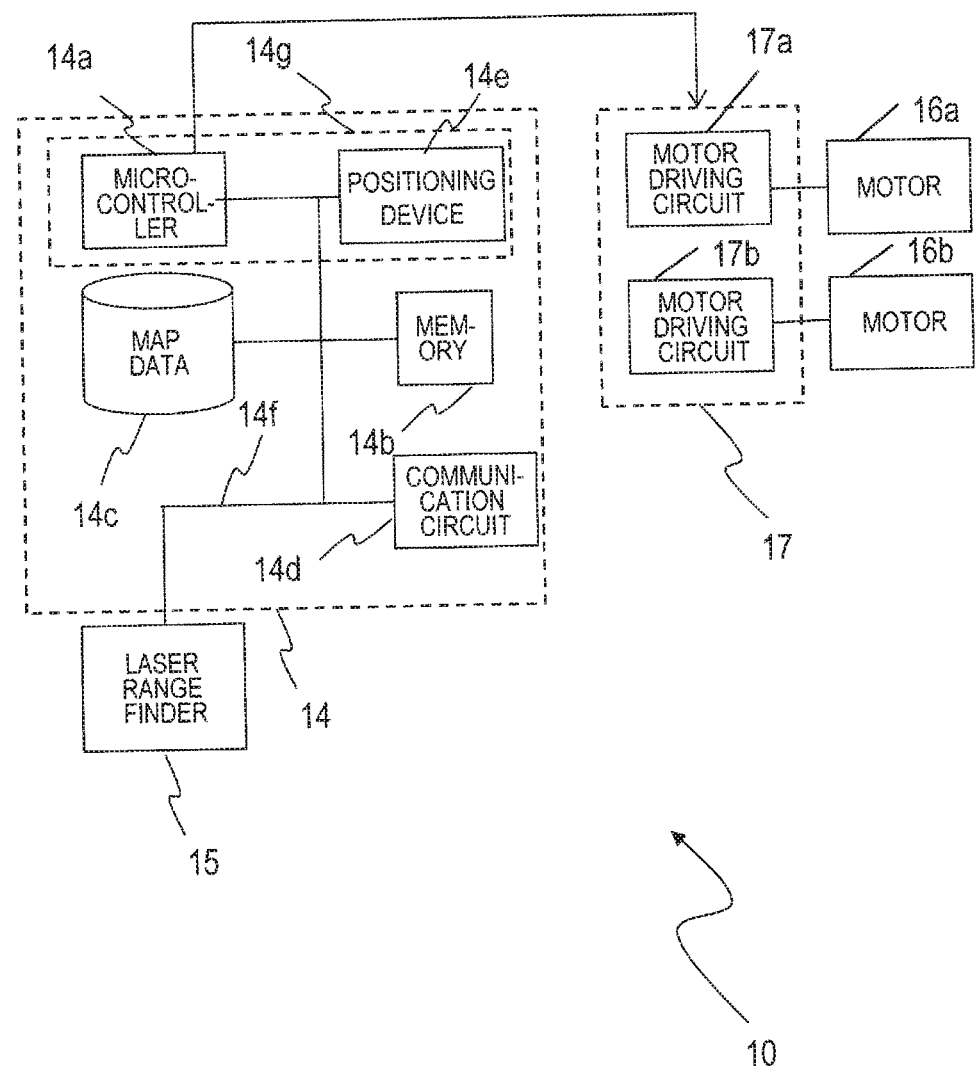
FIG. 4 is a diagram showing the hardware construction of the AGV 10.

FIG. 4 shows a hardware construction of the AGV 10. FIG. 4 also shows a specific construction of the travel control unit 14.

The AGV 10 includes the travel control unit 14, the laser range finder 15, two motors 16a and 16b, and a drive unit 17.

The travel control unit 14 includes a microcontroller 14a, a memory 14b, a storage device 14c, a communication circuit 14d, and a positioning device 14e. The microcontroller 14a, the memory 14b, the storage device 14c, the communication circuit 14d, and the positioning device 14e are connected via a communication bus 14f, so as to be capable of exchanging data with one another. The laser range finder 15 is also connected to the communication bus 14f via a communication interface (not shown), and transmits measurement data as results of measurement to the microcontroller 14a, the positioning device 14e and/or the memory 14b.

The microcontroller 14a is a processor or a control circuit (computer) that performs computation for controlling the entire AGV 10, including the travel control unit 14. Typically, the microcontroller 14a is a semiconductor integrated circuit. The microcontroller 14a transmits a PWM (Pulse Width Modulation) signal, which is a control signal, to the drive unit 17 to control the drive unit 17 so that the voltages to be applied to the motors are adjusted. As a result of this, each of the motors 16a and 16b rotates at a desired rotational speed.

The memory 14b is a volatile storage device which stores a computer program to be executed by the microcontroller 14a. The memory 14b may also be utilized as a work memory with which the microcontroller 14a and the positioning device 14e may perform computations.

The storage device 14c is a non-volatile semiconductor memory device which stores map data. However, the storage device 14c may be a magnetic storage medium such as a hard disk, or an optical storage medium such as an optical disc. Furthermore, the storage device 14c may include a head device for writing and/or reading data to and/or from either storage medium, and a controller for the head device. In the present embodiment, the map data is acquired before travel of the AGV 10 is begun, and stored in the storage device 14c.

The communication circuit 14d is a wireless communication circuit which performs wireless communications in a manner compliant with the Bluetooth (registered trademark) and/or the Wi-Fi (registered trademark) standards, for example. Either of such standards includes wireless communication standards which utilize frequencies in the 2.4 GHz band.

The positioning device 14e receives sensor data from the laser range finder 15, and reads out the map data that is stored in the storage device 14c. Local map data which is generated from the scanning results by the laser range finder 15 is matched against environmental map data that spans a greater extent, thus to identify the AGV's own location (x, y, θ) on the environmental map. The positioning device 14e generates a "reliability" that indicates the degree to which the local map data matches the environmental map data. The respective data of the AGV's own location (x, y, θ) and reliability may be transmitted from the AGV 10 to the travel management apparatus 20 and/or the tablet computer 4.

Figure 5:
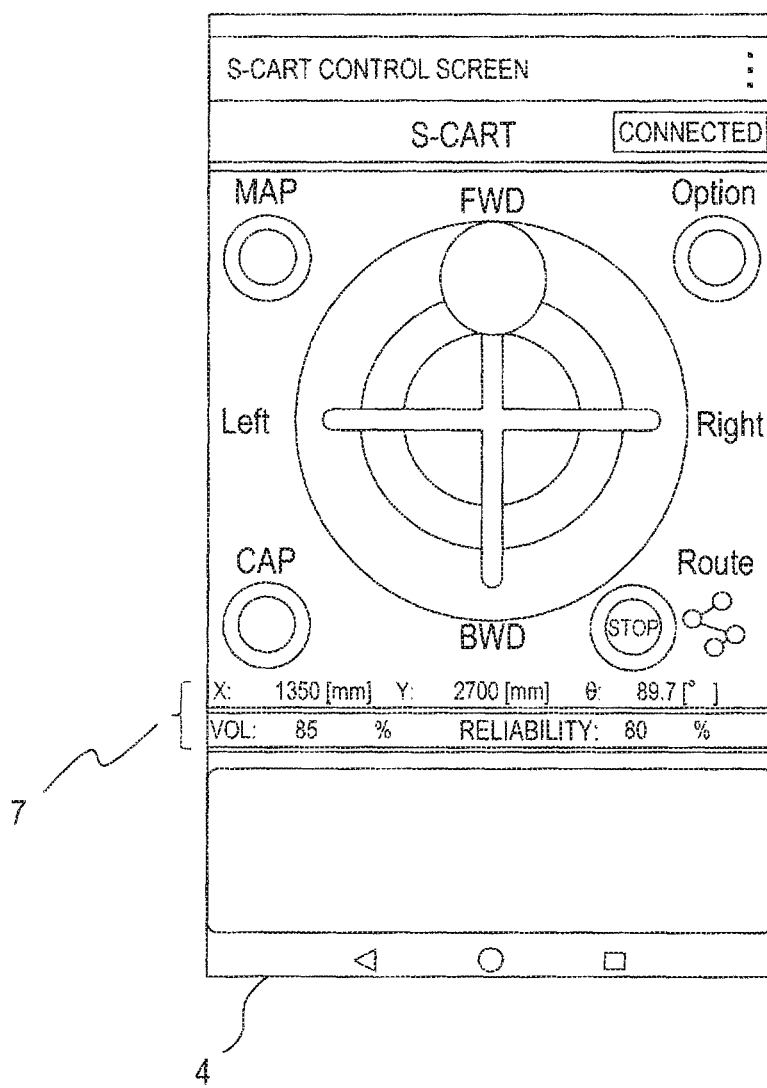
FIG. 5 is a diagram showing respective data of the AGV 10's own location (x, y, θ) and reliability, as displayed in a screen region 7 of the tablet computer 4.

For example, the tablet computer 4 receives the respective data of the AGV's own location (x y, θ) and reliability, and displays them on an internalized display device. FIG. 5 shows respective data of the AGV 10's own location (x, y, θ) and reliability, as displayed in a screen region 7 of the tablet computer 4.

Although the present embodiment illustrates the microcontroller 14a and the positioning device 14e as separate component elements, this is only an example. It may be a single chip circuit or semiconductor integrated circuit which is capable of independently performing the respective operations of the microcontroller 14a and the positioning device 14e. FIG. 4 shows a chip circuit 14g that includes the microcontroller 14a and the positioning device 14e. In the present disclosure, the microcontroller 14a, the positioning device 14e and/or the chip circuit 14g may be referred to as a computer or a signal processing circuit. The following description will assume an example where the microcontroller 14a and the positioning device 14e are provided separately and independently of each other.

The two motors 16a and 16b are respectively attached to the two wheels 11b and 11c in order to rotate the wheels. That is, the two wheels 11b and 11c are both driving wheels.

The drive unit 17 includes motor driving circuits 17a and 17b for adjusting respective voltages to be applied to the two motors 16a and 16b. Each of the motor driving circuits 17a and 17b is a so-called inverter circuit which, in accordance with a PWM signal that is transmitted from the microcontroller 14a, turns ON or OFF a current to flow in each motor, thus to adjust the voltage applied to the motor.

Figure 6:
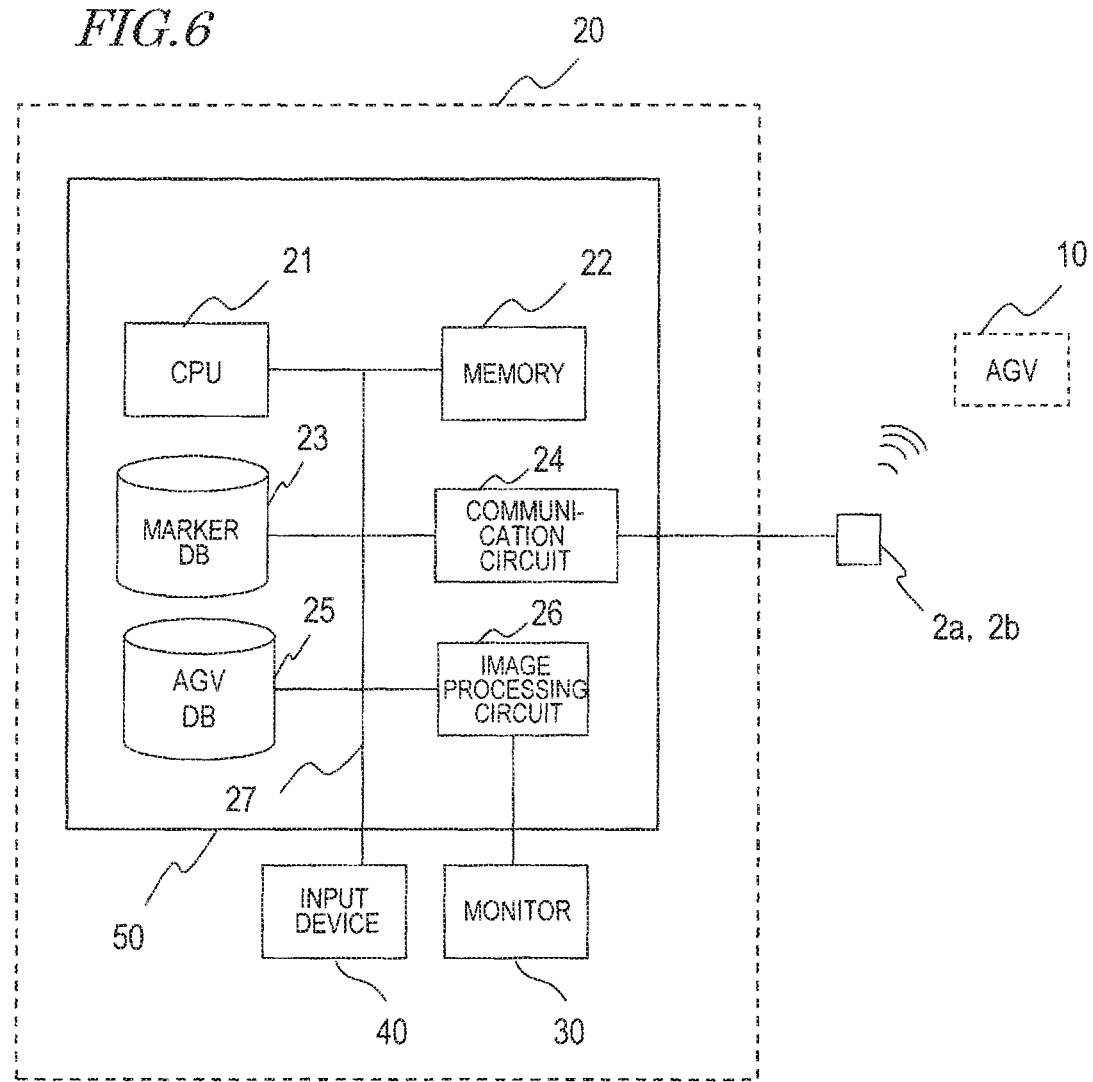
FIG. 6 is a diagram showing a hardware construction of a travel management apparatus 20.

FIG. 6 shows a hardware construction of the travel management apparatus 20. As described above, the travel management apparatus 20 includes the monitor 30, the input device 40, e.g., the keyboard 40a and the mouse 40b, and the PC 50.

The PC 50 includes the CPU 21, a memory 22, a marker database (marker DB) 23, a communication circuit 24, an AGV database (AGVDB) 25, and an image processing circuit 26. The CPU 21, the memory 22, the marker DB 23, the communication circuit 24, and the image processing circuit 26 are connected by a communication bus 27, so as to be capable of exchanging data with one another.

The CPU 21 is a signal processing circuit (computer) which controls operation of the travel management apparatus 20. Typically, the CPU 21 is a semiconductor integrated circuit.

The memory 22 is a volatile storage device which stores a computer program to be executed by the CPU 21. The memory 22 may also be utilized as a work memory with which the CPU 21 may perform computations. The computer program may be stored in a non-volatile storage device not shown, e.g., an EEPROM. Upon activation of the PC 50, the CPU 21 reads the computer program from the non-volatile storage device, and lays it out on the memory 22 for execution.

The marker DB 23 stores information of locations, which are designated by the user, on an image. In the present disclosure, marker objects are deployed at locations on an image as designated by the user 3. The marker DB 23 stores various data concerning the marker objects. The marker DB 23 retains rules to associate locations on the image with sets of coordinates within the space S to be traveled by the AGV 10. The rules concerning the latter may be retained in the memory 22. The marker DB 23 may be established on a non-volatile semiconductor memory, or established on a magnetic storage medium such as a hard disk or an optical storage medium such as an optical disc.

The communication circuit 24 performs wired communications in a manner compliant with the Ethernet (registered trademark) standards, for example. The communication circuit 24 is wiredly connected to the wireless access points 2a, 2b, etc., so as to be capable of communicating with the AGV 10 via the wireless access points 2a, 2b, etc. Via the bus 27, the communication circuit 24 receives data to be transmitted to the AGV 10 from the CPU 21. The communication circuit 24 transmits data (notification) received from the AGV 10 to the CPU 21 and/or the memory 22, via the bus 27.

In the AGVDB 25, data concerning the status of each AGV 10 is stored. The AGVDB 25 may be updated by receiving data from each AGV 10, or updated as a traveling path is generated by the CPU 21.

The image processing circuit 26 is a circuit which generates an image to be displayed on the monitor 30. The image processing circuit 26 is dedicated to operating when the user 3 manipulates the travel management apparatus 20. Note that the monitor 30 and/or the input device 40 may be integrated with the travel management apparatus 20. Moreover, processing by the image processing circuit 26 may be carried out by the CPU 21.

Note that the marker DB 23 and the AGVDB 25 may be the data itself that is stored in the storage device, or a combination of data and a computer program that functions as a database server. Alternatively, the marker DB 23 and the AGVDB 25 may be a combination of data and hardware that functions as a database server.

Next, with reference to exemplary images to be displayed on the monitor 30 as are illustrated in FIG. 7 to FIG. 13, operations of the travel management apparatus 20 will be described. By executing a computer program that is stored in the memory 22, the CPU 21 of the travel management apparatus 20 operates in accordance with the user's manipulation, so as to generate an image, described below, to be displayed on the monitor 30.

Figure 7:
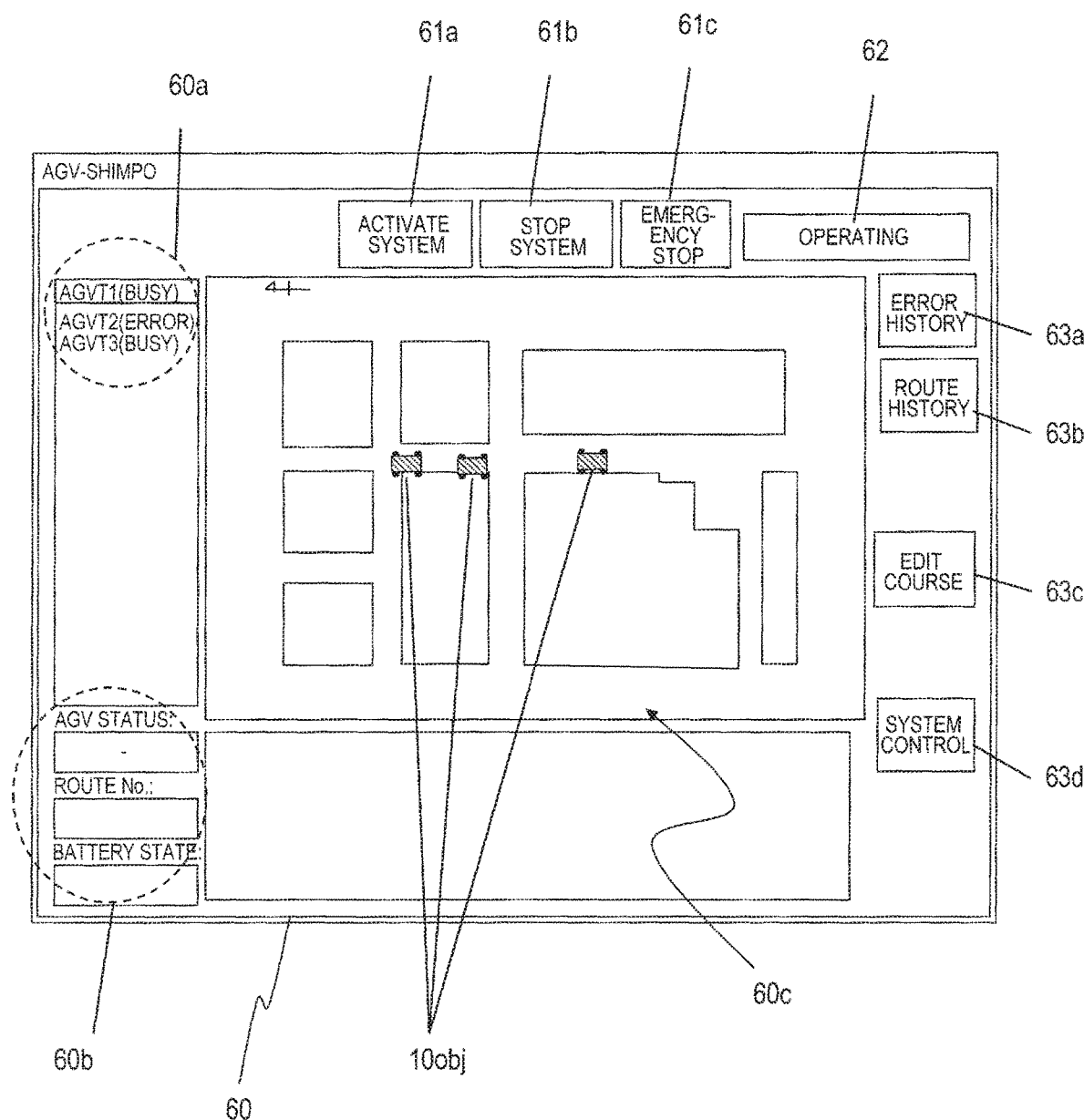
FIG. 7 is a diagram showing an exemplary image 60 to be displayed on a monitor 30 upon activation of the travel management apparatus 20.

FIG. 7 shows an exemplary image 60 to be displayed on the monitor 30 upon activation of the travel management apparatus 20.

The image 60 has a list region 60a, a status displaying region 60b, and an operations monitor region 60c. In the list region 60a, AGVs 10 that were placed under the management by the management system 100 because of being registered by the user 3 are displayed. In the status displaying region 60b, the status of a selected AGV 10 is displayed. Examples of "status" may be whether the AGV 10 is currently in a traveling state or a stopped state, whether an error is occurring or not, a number that specifies a traveling path which is currently set, and remainder of the battery.

In the operations monitor region 60c, a planar map image of a space S in which the AGVs 10 are to travel is displayed. The travel management apparatus 20 acquires this image via a data terminal not shown, and incorporates it into the image 60 for displaying. On the planar map image, objects 10obj indicating locations of the respective AGVs 10 that are displayed in the list region 60a are displayed. This allows the user 3 to know the location within the space S, and the status, of each AGV 10.

The image 60 further includes a plurality of button objects 61a through 61c, and 63a through 63d. When the user 3 selects a specific button object, the CPU 21 executes a process that is associated with the button object, and the image processing circuit 26 generates a new image representing a result of its processing and displays it. Selection of a button object is achieved, for example, as the user uses the mouse 40b to move the cursor onto a button object, and clicks a button on the mouse 40b. Alternatively, the user may use UP/DOWN/RIGHT/LEFT keys on the keyboard 40a to move the cursor onto a button object, and press an enter button of the keyboard 40a.

The button objects 61a through 61c are provided in order to activate, stop, and cause an emergency stop of, the management system 100, respectively. A region 62 of the image 60 displays a current state of the management system 100. The illustrated example shows that the system is currently operating.

The button objects 63a through 63d are provided in order to display an error history of a selected AGV 10, display a route history, edit the course which is a traveling path, and make operation settings, respectively.

Hereinafter, the operations of the travel management apparatus 20 to be respectively made when the button objects 63a through 63d are selected will be described.

FIG. 8 shows an exemplary image 70 to be displayed on the monitor 30 after the button object 63a (FIG. 7) is selected. In the image 70, a history of errors of the selected AGV 10 is displayed. As the history, for example, points in time (year/month/day/hour/minute/second) at which errors have occurred, coordinates of the places at which errors have occurred, and error codes and specific details of the errors are indicated. This error information has been transmitted from the AGV 10 to the travel management apparatus 20, and is stored in the AGVDB 25 of the travel management apparatus 20.

FIG. 9 shows an exemplary image 80 to be displayed on the monitor 30 after the button object 63b (FIG. 7) is selected. In the image 80, a traveling history of the selected AGV 10 is displayed. Indicated as the history are, for example: points in time (year/month/day/hour/minute/second) at which to pass locations within the actual space S that correspond to marker object locations as designated by the user 3; and names that are given to those marker objects.

Figure 10:
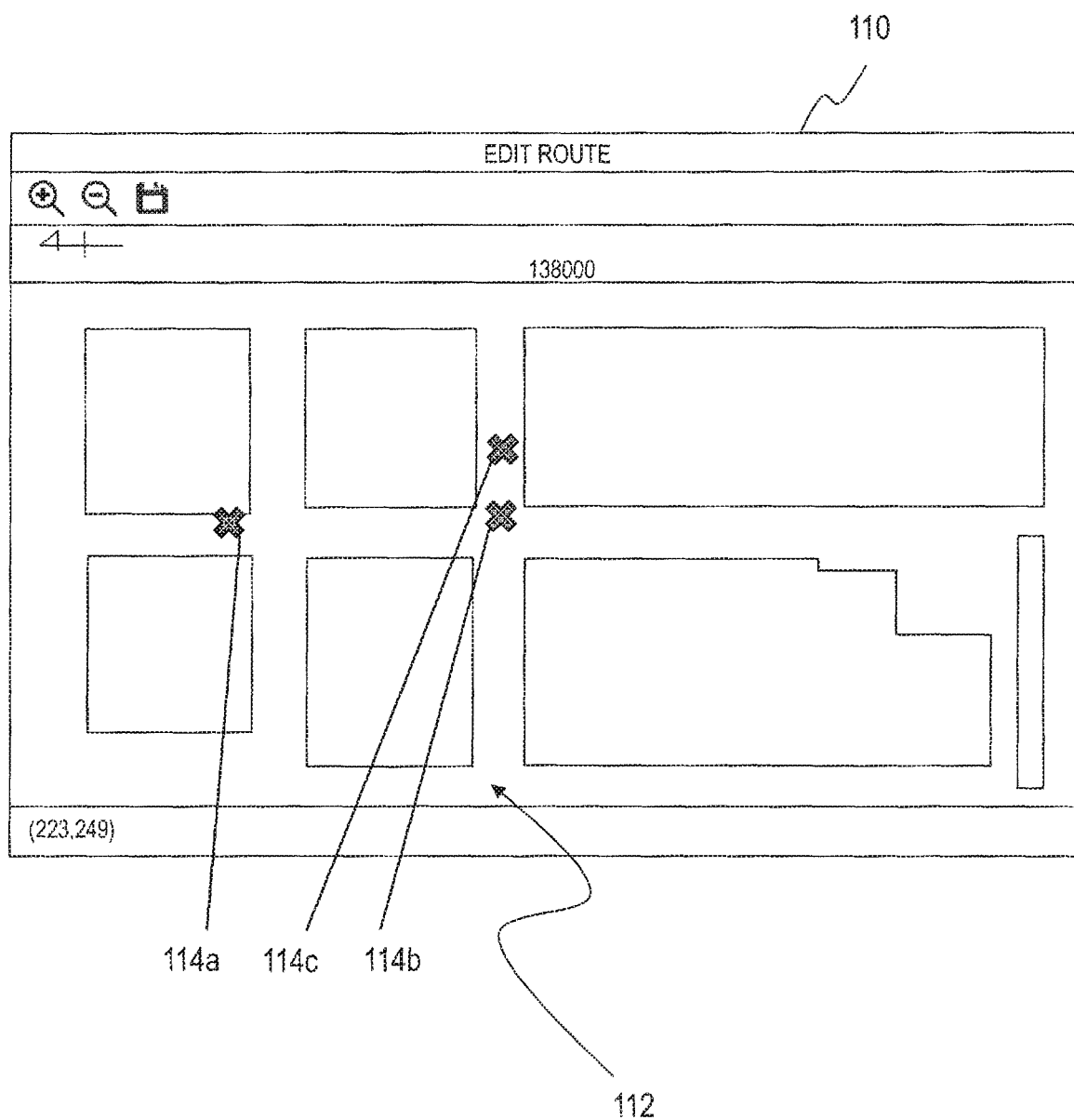
FIG. 10 is a diagram showing an exemplary image 110 to be displayed on the monitor 30 after a button object 63c (FIG. 7) is selected.

FIG. 10 shows an exemplary image 110 to be displayed on the monitor 30 after the button object 63c (FIG. 7) is selected. In the image 110 of the illustrated example, a planar map image 112 of the space S to be traveled by the AGVs 10 is displayed. By using the input device 40 to designate a location on the planar map image 112, the user 3 is able to determine a traveling path for the selected AGV 10. FIG. 10 indicates three locations 114a, 114b, and 114c that have been designated by the user 3 with "X". The user 3 is able to correct any location that is indicated with an "X" as necessary.

Figure 11:
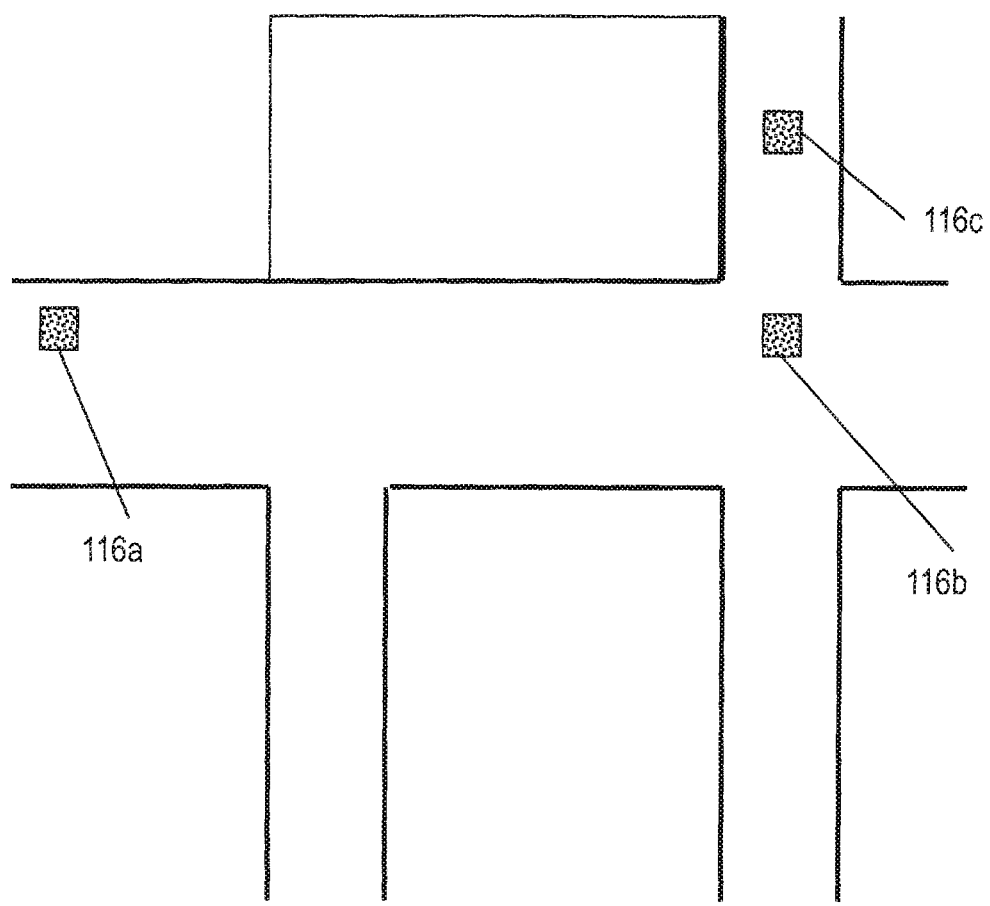
FIG. 11 is a diagram showing an example of marker objects 116a, 116b and 116c which are respectively displayed in locations 114a, 114b, and 114c that are selected by the user 3.

Suppose that the user 3 has consecutively designated the locations 114a, 114b, and 114c on the planar map image 112. Thereafter, when the user 3 selects a button object not shown indicating that designation of locations is finished, the CPU 21 sends the sets of coordinates the locations 114a, 114b, and 114c and an instruction to display marker objects at these sets of coordinates, to the image processing circuit 26. Upon receiving the instruction, the image processing circuit 26 generates an image showing the marker objects at the designated sets of coordinates. FIG. 11 shows an example of marker objects 116a, 116b and 116c which are respectively displayed in the locations 114a, 114b, and 114c as selected by the user 3. Although the present embodiment illustrates the shape of each marker object as "■", its shape may be arbitrary.

The CPU 21 determines the traveling path so that the AGV 10 will travel, in an order designated by the user 3, through coordinate positions within the space S that correspond to the locations of the marker objects 116a, 116b and 116c. Specifically, the CPU 21 determines a path such that the AGV 10 heads from the location 114a toward the location 114b, and upon reaching location 114b then heads toward the location 114c. The path may be a straight line or a curve. The CPU 21 converts the locations at which the respective marker objects are set on the image and the path, respectively, into sets of coordinates within the space S and a traveling path. Now let a set of coordinates within the space S that has been converted from the location 116a be conveniently denoted as "coordinates A". Similarly, let sets of coordinates within the space S that have been converted respectively from the locations 116bb and 116c be denoted as "coordinates B" and "coordinates C". The CPU 21 generates traveling path data such that the AGV 10 heads from coordinates A to coordinates B, and upon reaching coordinates B then heads toward coordinates C.

The traveling path data may be stated in accordance with predetermined rules. For example, suppose that the user 3 designates a certain marker object and then another marker object. Conveniently, the earlier-designated marker object will be referred to as a "first marker object", and the later-designated marker object as a "second marker object". The traveling path may be determined by "interconnection information" indicating a second marker object to be visited after the first marker object, and "locus information" that indicates the shape of a locus from the first marker object to the second marker object. In the present disclosure, information determining traveling conditions for the AGV 10, such as the aforementioned "interconnection information" and the "locus information", is referred to as "attribute information". The aforementioned interconnection information and locus information may be included as part of the attribute information of the first marker object.

As described above, the respective locations of the first marker object and the second marker object on the image are converted into a "first set of coordinates" and a "second set of coordinates", each of which defines a set of coordinates within the space S. The attribute information of the first marker object includes a set of an X-axis coordinate and a Y-axis coordinate specifying the first set of coordinates, whereas the attribute information of the second marker object includes a set of an X-axis coordinate and a Y-axis coordinate specifying the second set of coordinates. These names "first set of coordinates" and "second set of coordinates" are adopted also conveniently.

The traveling path data is transmitted by the communication circuit 24 to each AGV 10 via the wireless access points 2a, 2b, etc.

FIG. 12 shows an exemplary first image 120 to be displayed on the monitor 30 after the button object 63d (FIG. 7) is selected. The illustrated example shows a listing of attribute information for a given marker object. Examples of attribute information may be as follows. Note that a set of coordinates within the space S which results by converting the set of coordinates of a marker object that is designated next to the given marker object will be referred to as "a set of coordinates of a next target location" (the same will also be true throughout the rest of the present specification).

An AGV ID(s) or name(s) specifying the AGV(s) 10 under the given traveling conditions
a set of coordinates (x,y) within the space S as converted from the set of coordinates of the marker object
an angle (θ) indicating the direction of travel of the AGV 10 heading for a set of coordinates of a next target location
an orientation of the AGV 10 ("FORE" meaning forward travel, "BACK" meaning backward travel)
information (name, etc.) indicating a marker object that is designated next to the given marker object
a velocity of the AGV 10 heading for a next marker object With respect to each marker object that is set as illustrated in FIG. 11, the CPU 21 sets or changes traveling conditions for each AGV 10, in accordance with manipulations by the user 3.

Figure 13:
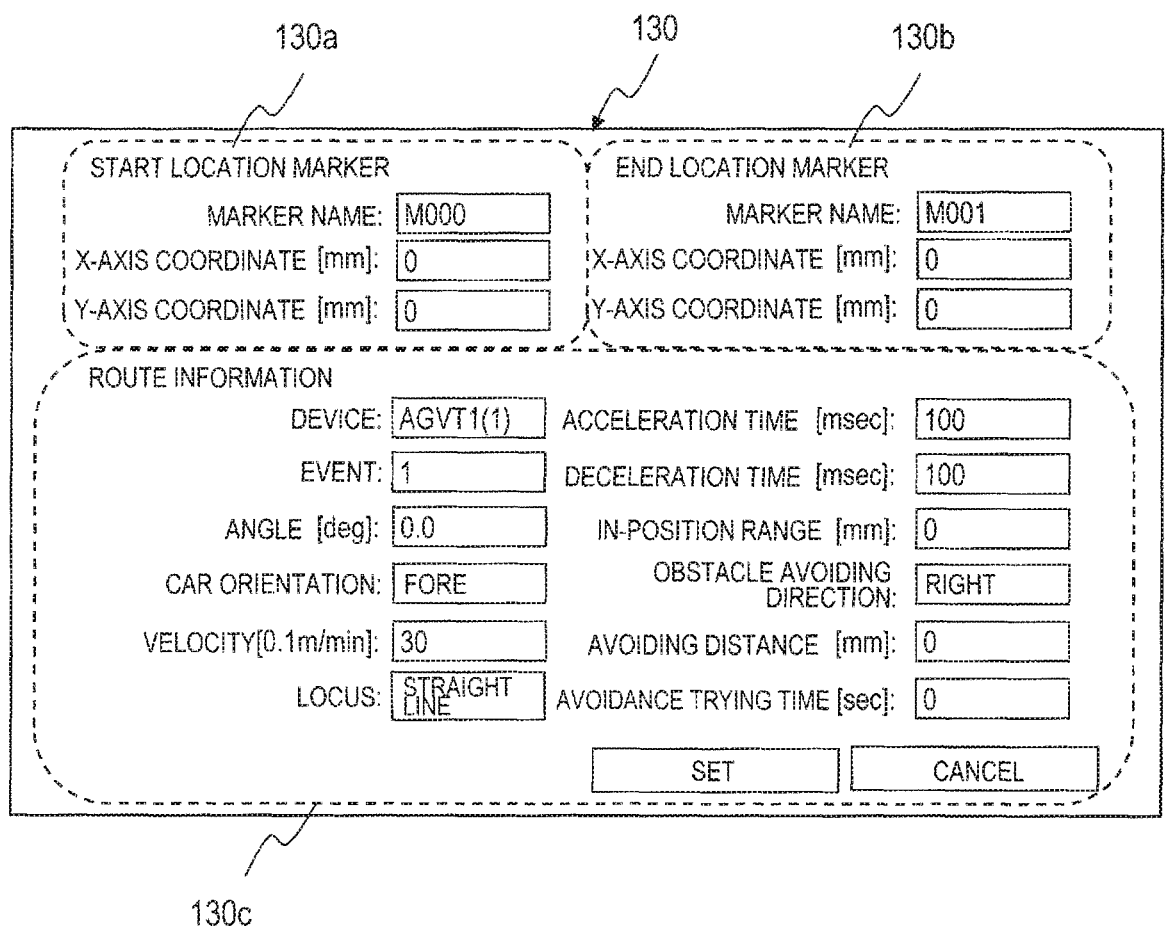
FIG. 13 is a diagram showing an exemplary second image 130 to be displayed on the monitor 30 after a button object 63d (FIG. 7) is selected.

FIG. 13 shows an exemplary second image 130 to be displayed on the monitor 30 after the button object 63d (FIG. 7) is selected. The second image 130 may be displayed when a marker object indicating a start location of travel of the AGV 10 or a marker object indicating an end location of travel of the AGV 10 is set.

The second image 130 includes three regions 130a, 130b and 130c. The regions 130a 130b respectively show attribute information of marker objects indicating a start location of travel and an end location of travel, or specifically: the name of each marker object and a set of coordinates (x,y) within the space S as converted from the set of coordinates of each marker object.

The region 130c shows detailed attribute information concerning the traveling path. Examples of attribute information may be as follows.

An AGV ID(s) or name(s) specifying the AGV(s) 10 under the given traveling conditions
an angle indicating the direction of travel of the AGV 10 heading for a set of coordinates of a next target location
an orientation of the AGV 10 ("FORE" meaning forward travel, "BACK" meaning backward travel)
a velocity of the AGV 10 heading for a set of coordinates of a next target location
a shape (straight line, circular arc) of the locus of the traveling path
an acceleration time and a deceleration time for the AGV 10
an in-position range
an avoiding direction (right or left), a distance for avoidance, and a length of time for which avoidance is tried upon detecting an encounter with an obstacle The aforementioned "in-position range" means a range (region) within which an AGV 10, even though it has not quite reached the set of coordinates of a next target location, can be regarded as having reached there. The size of the region may be set for each next target location. For example, if the region is a circular region which is centered around a next target location, then the user 3 may set the radius value of the circular region as attribute information. The unit may be in millimeter, for example.

Note that a charging condition stipulating whether charging is to be made or not in accordance with the remaining charge and the like, a no-entry condition stipulating a region into which the AGV 10 is prohibited from entering, or the like may also be set as attribute information.

An exemplary method of detecting whether the AGV 10 has reached the given region or not may be to utilize an output from the positioning device 14e (FIG. 4) which is provided in the AGV 10. The AGV 10 may match the output from the positioning device 14e against the map data, estimate a best-matching location on the map data as the AGV's own location, and determine whether the AGV's own location thus estimated is within the given region or not.

The user 3 is able to change each of the regions 130a, 130b and 130c shown in FIG. 13. The CPU 21 stores the attribute information after the change(s) to the AGVDB 25 (FIG. 6), and set or change traveling conditions for each AGV 10.

Now, with reference to FIGS. 14A through 14C, the locus of the traveling path for the AGV 10 will be described.

Figure 14A:
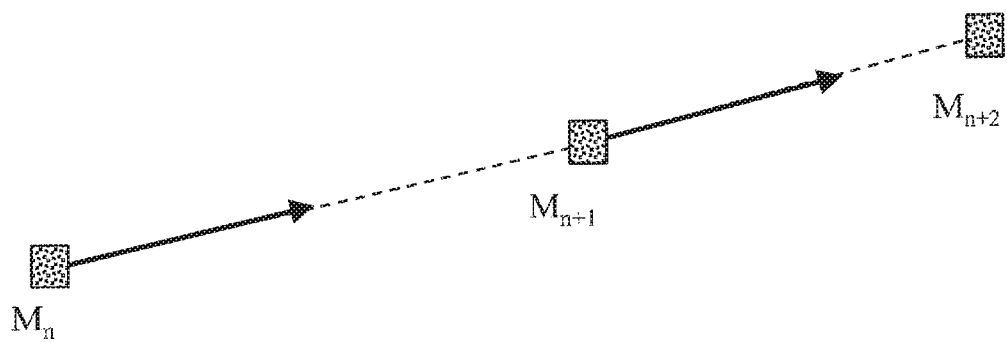
FIG. 14A is a diagram showing a moving path of the AGV 10 when traveling straight.

FIG. 14A shows a moving path of the AGV 10 when traveling straight. The AGV 10 may begin traveling from a location $M_n$, and after reaching a location $M_{n+1}$, continue to move linearly to a next location $M_{n+2}$.

Figure 14B:
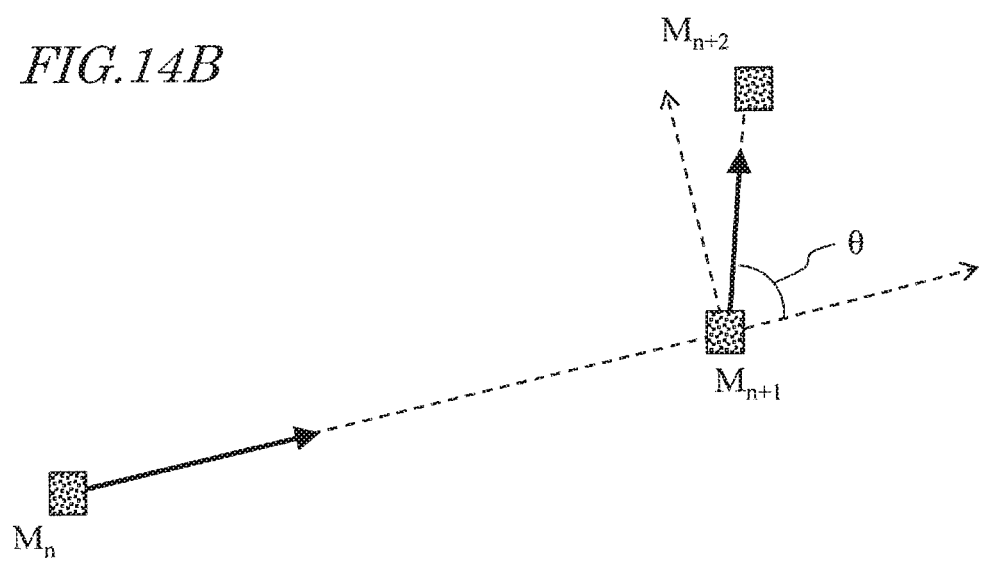
FIG. 14B is a diagram showing a moving path of the AGV 10 turning left at a location $M_{n+1}$ and moving toward a location $M_{n+2}$.

FIG. 14B shows a moving path of the AGV 10 turning left at a location $M_{n+1}$ and moving toward a location $M_{n+2}$. The AGV 10 begins traveling from a location $M_n$, and at the location $M_{n+1}$, rotates a motor that is located on the right side of its moving direction, and stops a motor that is located on the left side of its moving direction. After rotating counterclockwise by an angle θ in that place, the AGV 10 rotates all motors at equal speeds toward the location $M_{n+2}$, thus to travel straight.

Figure 14C:
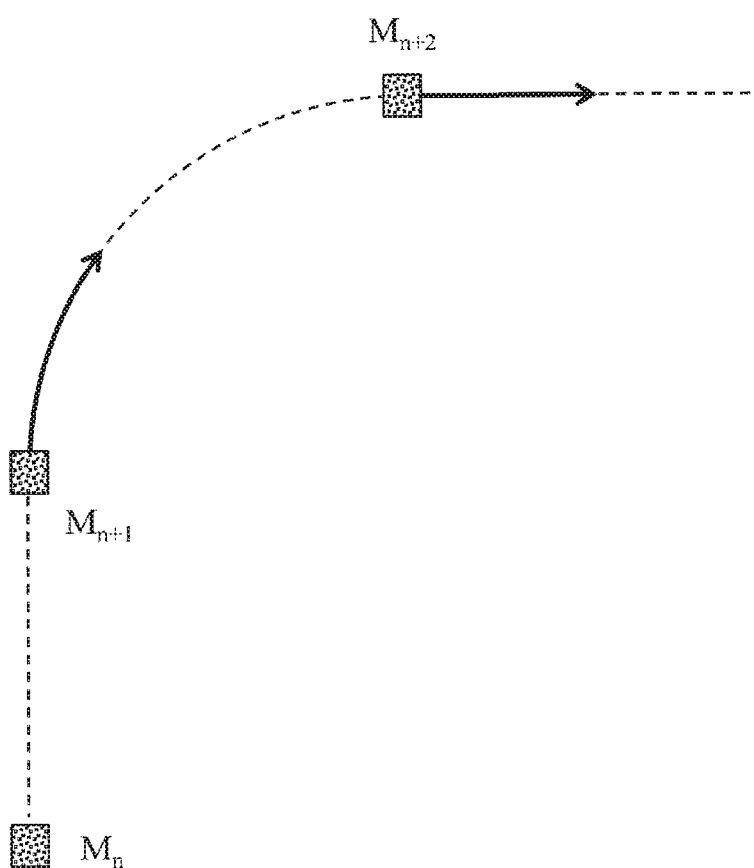
FIG. 14C is a diagram showing a moving path of the AGV 10 when moving in a circular arc shape from a location $M_{n+1}$ to a location $M_{n+2}$.

FIG. 14C shows a moving path of the AGV 10 when moving in a circular arc shape from a location $M_{n+1}$ to a location $M_{n+2}$. After reaching the location $M_{n+1}$, the AGV 10 increases the rotational speed of the outer motor over that of the inner motor. This allows the AGV 10 to move in a circular arc path toward the next location $M_{n+2}$.

As the drive unit 17 introduces a relative difference in rotational speed between the motors 16a and 16b in accordance with a control signal, the AGV 10 is able to turn or rotate in the direction of the slower rotational speed.

Next, an operation of the management system 100 will be described with reference to FIG. 15.

FIG. 15 shows processing by the travel management apparatus 20 and the respective procedures of processes of the AGV 10 as it travels based on results of the processing. In FIG. 15, the right row shows the procedures of processes to be executed by the CPU 21 of the travel management apparatus 20, while the left row shows the procedures of processes to be executed by the microcontroller 14a of the AGV 10.

At step S1, via the input device 40, the CPU 21 accepts designation of locations to be passed of the AGV 10. At step S2, the CPU 21 instructs the image processing circuit 26 to deploy marker objects at the designated locations. At step S3, the CPU 21 repeats steps S1 and S2 until designation of locations is finished. Once designation of locations is finished, the process proceeds to step S4.

At step S4, the CPU 21 converts the sets of coordinates on the image at which the marker objects were deployed into sets of coordinates in the space to be traveled by the AGV.

At step S5, the CPU 21 converts the virtual traveling path which passes through the plurality of marker objects into traveling path data in the space to be traveled by the AGV.

At step S6, via the communication circuit 24, the CPU 21 transmits the traveling path data to the AGV 10.

At step S11, the microcontroller 14a of the AGV 10 receives the traveling path data.

At step S12, the microcontroller 14a generates a control signal (PWM signal) in accordance with the traveling path data. At step S13, the microcontroller 14a causes the drive unit 17 to independently control the voltage to be applied to each motor in accordance with the control signal, thus rotating each driving wheel (wheels 11b and 11c). As a result, the AGV 10 is able to travel along the traveling path as instructed by the travel management apparatus 20.

INDUSTRIAL APPLICABILITY

The management system for vehicles according to the present disclosure is broadly used in controlling travel of a vehicle that moves indoors or outdoors.

REFERENCE SIGNS LIST 2a, 2b wireless access point
3 user
4 tablet computer
10 AGV (vehicle)
20 travel management apparatus
21 CPU (computer)
22 memory
23 marker database (marker DB)
24 communication circuit
25 AGV database (AGVDB)
26 image processing circuit
27 communication bus
30 monitor
40 input device
40a keyboard
40b mouse
50 PC (managing computer)
100 management system

The invention claimed is:

1. A management system comprising at least one vehicle and a travel management apparatus, the management system managing travel of the vehicle by using the travel management apparatus, wherein, the vehicle includes:
  a plurality of motors;
  a plurality of driving wheels respectively coupled to the plurality of motors;
  a drive unit which independently controls a voltage to be applied to each motor in accordance with a control signal, to rotate each of the plurality of driving wheels;
  a first communication circuit which communicates with the travel management apparatus to receive data representing a traveling path; and
  a control circuit which generates the control signal for causing the vehicle to travel along the traveling path, and the travel management apparatus includes:
  an image displaying device;
  an input device which accepts a manipulation by a user;
  an image processing circuit which generates an image to be displayed on the image displaying device, the image processing circuit generating, when the input device accepts from the user a designation of a plurality of locations on the image displaying device, an image containing a plurality of marker objects indicating the plurality of locations;
  a signal processing circuit which converts a set of coordinates of each marker object on the image into a corresponding set of coordinates in a space to be traveled by the vehicle, and sets a line segment or a curve on the image displaying device that interconnects the plurality of marker objects as the traveling path in the space; and
  a second communication circuit which transmits data representing each set of coordinates in the space and the traveling path to the vehicle;

the image processing circuit further generates a course setting image;

the plurality of marker objects include a first marker object and a second marker object; and the course setting image is
  (A) an image indicating, for each of the plurality of marker objects, a listing of attribute information such that, in the listing, attribute information of the first marker object contains interconnection information indicating the second marker object to which the line segment or the curve is connected, or
  (B) an image containing first attribute information of the first marker object and second attribute information of the second marker object, the first attribute information comprising values of first set of coordinates within the space into which the set of coordinates of the first marker has been converted, the second attribute information comprising values of second set of coordinates within the space into which the set of coordinates of the second marker has been converted.

2. The management system of claim 1, wherein, the course setting image is the image of (A); and
the attribute information of the first marker object contains a set of coordinates in the space to be traveled by the vehicle as converted by the signal processing circuit.

3. The management system of claim 2, wherein, the signal processing circuit converts a set of coordinates of the first marker object into a first set of coordinates in the space to be traveled by the vehicle; and
the attribute information of the first marker object comprises values of the first set of coordinates.

4. The management system of claim 3, wherein, the attribute information of the first marker object comprises a value of an angle indicating a direction of travel for the vehicle from the first set of coordinates.

5. The management system of claim 3, wherein the attribute information of the first marker object comprises a value of a traveling velocity for the vehicle from the first set of coordinates.

6. The management system of claim 1, wherein, the course setting image is the image of (B); and
the course setting image further contains attribute information concerning the traveling path.

7. The management system of claim 6, wherein the attribute information concerning the traveling path comprises a value of an angle indicating a direction of travel for the vehicle.

8. The management system of claim 6, wherein the attribute information concerning the traveling path comprises a value of a traveling velocity for the vehicle.

9. The management system of claim 6, wherein the attribute information concerning the traveling path comprises values of an acceleration time and a deceleration time for the vehicle.

10. The management system of claim 6, wherein the attribute information concerning the traveling path comprises information defining a region which is determined in accordance with the second set of coordinates.

11. The management system of claim 6, wherein the attribute information concerning the traveling path comprises values of an avoiding direction, a distance for avoidance, and a time for which avoidance is tried, for when the vehicle encounters an obstacle.

12. The management system of claim 1, wherein, as the traveling path in the space, the signal processing circuit sets a circular arc on the image displaying device that interconnects the plurality of marker objects.

13. The management system of claim 1, wherein, when the at least one vehicle comprises a plurality of vehicles,
the input device of the travel management apparatus accepts a manipulation by the user with respect to each vehicle; and
the signal processing circuit sets the traveling path with respect to each vehicle.

14. The management system of claim 1, wherein, the at least one vehicle comprises a plurality of vehicles; and the signal processing circuit designates each vehicle to travel or stop.

15. The management system of claim 1, further comprising a data terminal with which to acquire data of a map image of the space, wherein
the image processing circuit displays an image comprising the plurality of marker objects and the map image of the space.

16. The management system of claim 1, wherein, when the traveling path is a curve, the drive unit introduces a relative difference in rotational speed among the motors for causing a turn.

17. The management system of claim 1, wherein, the vehicle further includes a positioning device which estimates the vehicle's own location of and outputs values of an estimated set of coordinates; and
the first communication circuit transmits the values of the set of coordinates.

18. The management system of claim 1, wherein, the image processing circuit, the image further contains a button object for stopping management of travel of the vehicle; and,
when the input device accepts a designation of the button object from the user, the signal processing circuit generates a signal for stopping travel of the vehicle, and the second communication circuit transmits the signal to the vehicle.

19. The management system of claim 1, wherein the image processing circuit further generates an image containing one of an error history of the vehicle and a history of the traveling path.

20. A method of managing travel of at least one vehicle by using a travel management apparatus,
the vehicle including:
a plurality of motors,
a plurality of driving wheels respectively coupled to the plurality of motors,
a drive unit which independently controls a voltage to be applied to each motor in accordance with a control signal, to rotate each of the plurality of driving wheels,
a first communication circuit which communicates with the travel management apparatus to receive data representing a traveling path, and
a control circuit which generates the control signal for causing the vehicle to travel along the traveling path,
the travel management apparatus including an image displaying device, an input device, an image processing circuit, a signal processing circuit which is a computer, and a second communication circuit, wherein
the method is performed by the computer, and comprises:
accepting via the input device a designation of a plurality of locations on the image displaying device from a user,
causing, the image processing circuit to generate an image containing a plurality of marker objects indicating the plurality of locations and a course setting image,
converting a set of coordinates of each marker object on the image into a set of coordinates in a space to be traveled by the vehicle,
setting a line segment or a curve on the image displaying device that interconnects the plurality of marker objects as the traveling path in the space, and
transmitting data representing each set of coordinates in the space and the traveling path to the vehicle via the second communication circuit;

the plurality of marker objects include a first marker object and a second marker object; and the course setting image is (A) an image indicating, for each of the plurality of marker objects, a listing of attribute information such that, in the listing, attribute information of the first marker object contains interconnection information indicating, the second marker object to which the line segment or the curve is connected, or (B) an image containing first attribute information of the first marker object and second attribute information of the second marker object, the first attribute information comprising values of first set of coordinates within the space into which the set of coordinates of the first marker has been converted the second attribute information comprising values of second set of coordinates within the space into which the set of coordinates of the second marker has been converted.

21. A non-transitory computer-readable storage medium including a computer program to be executed by a computer mounted in a travel management apparatus which is used in a management system to manage travel of at least one vehicle, the vehicle including:
 a plurality of motors,
 a plurality of driving wheels respectively coupled to the plurality of motors,
 a drive unit which independently controls a voltage to be applied to each motor in accordance with a control signal, to rotate each of the plurality of driving wheels,
 a first communication circuit which communicates with the travel management apparatus to receive data representing a traveling path, and
 a control circuit which generates the control signal for causing the vehicle to travel along the traveling path, the travel management apparatus including an image displaying device, an input device, an image processing circuit, a computer, and a second communication circuit, wherein the computer program causes the computer to,
 by using the input device, accept a designation of a plurality of locations on the image displaying device from a user,
 by using the image processing circuit, generate an image containing a plurality of marker objects indicating the plurality of locations and a course setting image,
 convert a set of coordinates of each marker object on the image into a set of coordinates in a space to be traveled by the vehicle,
 set a line segment or a curve on the image displaying device that interconnects the plurality of marker objects as the traveling path in the space, and,
 by using the second communication circuit, transmit data representing each set of coordinates in the space and the traveling path to the vehicle;

the plurality of marker objects include a first marker object and a second marker object; and the course setting image is:

(A) an image indicating, for each of the plurality of marker objects, a listing of attribute information such that, in the listing, attribute information of the first marker object contains interconnection information indicating the second marker object to which the line segment or the curve is connected, or (B) an image containing first attribute information of the first marker object and second attribute information of the second marker object, the first attribute information comprising values of first set of coordinates within the space into which the set of coordinates of the first marker has been converted the second attribute information comprising, values of second set of coordinates within the space into which the set of coordinates of the second marker has been converted.

* * * * *